US008111190B2

(12) United States Patent
Hori

(10) Patent No.: US 8,111,190 B2
(45) Date of Patent: Feb. 7, 2012

(54) NAVIGATION APPARATUS AND NAVIGATION-RELATED INFORMATION DISPLAY METHOD

(75) Inventor: Katsuya Hori, Kanagawa (JP)

(73) Assignee: Sony Corporation, Tokyo (JP)

( * ) Notice: Subject to any disclaimer, the term of this patent is extended or adjusted under 35 U.S.C. 154(b) by 589 days.

(21) Appl. No.: 12/270,427

(22) Filed: Nov. 13, 2008

(65) Prior Publication Data

US 2009/0135062 A1    May 28, 2009

(30) Foreign Application Priority Data

Nov. 27, 2007    (JP) ................................ 2007-306365

(51) Int. Cl.
*G01S 19/27* (2010.01)
(52) U.S. Cl. ................................................. 342/357.66
(58) Field of Classification Search ............. 342/357.15, 342/357.66
See application file for complete search history.

(56) References Cited

U.S. PATENT DOCUMENTS

| | | | | |
|---|---|---|---|---|
| 5,222,245 | A * | 6/1993 | Ando et al. | 455/13.2 |
| 6,242,920 | B1 * | 6/2001 | Nelson et al. | 324/427 |
| 6,317,689 | B1 | 11/2001 | Lee | |
| 6,373,431 | B1 | 4/2002 | Nakajima | |
| 7,633,438 | B2 * | 12/2009 | Tysowski | 342/357.64 |
| 2002/0027525 | A1 * | 3/2002 | Pietila et al. | 342/357.15 |
| 2006/0290974 | A1 * | 12/2006 | Kano et al. | 358/1.15 |
| 2009/0278741 | A1 * | 11/2009 | Miyata | 342/357.15 |
| 2010/0004850 | A1 * | 1/2010 | Arita | 701/200 |

FOREIGN PATENT DOCUMENTS

| | | |
|---|---|---|
| JP | 3-295411 | 12/1991 |
| JP | 10-73650 | 3/1998 |
| JP | 2000-304842 | 11/2000 |
| JP | 2000-338220 | 12/2000 |
| JP | 2001-74494 | 3/2001 |
| JP | 2002-181915 | 6/2002 |
| JP | 2003-255037 | 9/2003 |
| JP | 2003-337166 | 11/2003 |
| JP | 3700882 | 7/2005 |

OTHER PUBLICATIONS

Javad Positioning Systems, "A GPS Tutorial", 1998.*
Fugro N.V. "Starfix.MRDGPS", Jan. 10, 2007.*
Garmin Ltd., "GPS152 trackplotter Owner's Manual and Reference Guide", 2002.*

* cited by examiner

*Primary Examiner* — Thomas Tarcza
*Assistant Examiner* — Frank McGue
(74) *Attorney, Agent, or Firm* — Oblon, Spivak, McClelland, Maier & Neustadt, L.L.P.

(57) ABSTRACT

A navigation apparatus and a navigation-related information display method acquire a plurality of orbit data from a plurality of GPS satellites, pinpoint the current geographical position of the apparatus according to the orbit data and distance data on the distances from the plurality of GPS satellites, display the acquiring progress level until completely acquiring a plurality of orbit data sufficient for pinpointing the current geographical position, count the remaining effective time of the plurality of orbit data acceptable for pinpointing the current geographical position and display the remaining effective time by means of a level mark that is provided with a gradation.

10 Claims, 11 Drawing Sheets

NAVIGATION APPARATUS AND NAVIGATION-RELATED INFORMATION DISPLAY METHOD

CROSS REFERENCES TO RELATED APPLICATIONS

The present invention contains subject matter related to Japanese Patent Application JP2007-306365 filed in the Japanese Patent Office on Nov. 27, 2007, the entire contents of which being incorporated herein by reference.

BACKGROUND OF THE INVENTION

1. Field of the Invention

The present invention relates to a navigation apparatus and a navigation-related information display method that can suitably be applied to freely portable navigation devices.

2. Description of the Related Art

Known portable navigation devices (to be referred to as PNDs hereinafter) are designed to acquire data necessary for pinpointing the current geographical position (latitude and longitude) of a vehicle from at least three global positioning system (GPS) satellites and computationally determine the position of the vehicle by analyzing the data.

PNDs are also designed to be able to computationally determine the altitude of the vehicle in addition to the current geographical position (latitude and longitude) of the vehicle by acquiring and analyzing data necessary for pinpointing the current geographical position from three or more than three GSP satellites.

Then, the PND displays the current geographical position of the vehicle on a map, and after searching for available routes from the starting point to the destination of the vehicle, it navigates the user to the destination by way of the best available route.

Meanwhile, the PND requires orbit data including satellite orbit information from the GPS satellites from which it can receive signals to pinpoint the current geographical position of the vehicle. Orbit data are information that is updated every two hours and has an effective service life about four hours after the update.

Therefore, when the power source of a PND is turned off for more than four hours, it has to acquire orbit data anew from each of the GPS satellites. Since orbit data are transmitted from each GPS satellite at a cycle period of about 30 seconds, the PND desirably be able to secure a communication environment that allows it to receive orbit data continuously for at least 30 seconds.

While the PND can desirably secure a good communication environment that allows it to receive orbit data transmitted from each GPS satellite continuously for at least 30 seconds, it cannot more often than not secure such a good communication environment probably because it is running or, if it is at a stop, it is shadowed by a building.

In such a situation, the PND needs to wait until it can acquire a complete set of orbit data in the next cycle period because it cannot acquire a complete set of orbit data in the current cycle period. If the PND cannot acquire a complete set of orbit data in the next cycle period, it then has to wait until the cycle period after the next in order to acquire a complete set of orbit data.

In actuality, since the PND has to acquire orbit data from three or more than three GPS satellites, it may sometime has to spend several minutes until it can acquire a complete set of orbit data from each of the three or more than three GPS satellites.

Then, when the power source of the PND is turned on after having been turned off for more than four hours or when the PND is in a communication environment where it cannot receive signals from GPS satellites for more than four hours, the user is required to wait for several minutes until he or she can pinpoint the current geographical position of the vehicle. Then, the user may have to feel uneasy during the several minutes.

Satellite information display apparatus have been proposed to show the user the progress of the operation of acquiring orbit data from GPS satellites in the form of a numerical value or a bar graph while the PND is actually acquiring orbit data from the GPS satellites so as to relieve the user from uneasiness (refer to, e.g., Patent Document 1: Jpn. Pat. Appln. Laid-Open Publication No. 2002-181915).

GPS receivers adapted to display not the progress of the operation of acquiring orbit data but the signal reception level from a GPS satellite have also been proposed (refer to, e.g., Patent Document 2: Japanese Patent Publication No. 3700882).

SUMMARY OF THE INVENTION

While a satellite information display apparatus disclosed in the above-cited Patent Document 1 allows the user to check the progress of the operation of acquiring orbit data from each satellite, it does not display the remaining effective time that can be spent for pinpointing the current position without updating the orbit data of each satellite.

Assume, for example, that a vehicle is in a situation where it is staying underground and hence cannot acquire orbit data from GPS satellites for a long period of time and the remaining effective time that can be spent for pinpointing the current geographical position of the vehicle has elapsed. Then, if the vehicle restores a situation where it can receive signals from GPS satellites again after a while, the user is forced to wait several minutes before he or she can pinpoint the current geographical position once again without being notified of the reason why he or she is forced to wait such a long time to make the user feel uneasy.

In view of the above-identified circumstances, the present invention proposes a navigation apparatus and a navigation-related information display method that make the user easily and intuitively understand the progress of the operation of acquiring orbit data until the time when he or she becomes able or unable to pinpoint the current geographical position.

In order to solve the above-described problems, an aspect of the present invention includes features of: acquiring a plurality of orbit data by demodulating each of the orbit data of a plurality of satellites received from the satellites; computationally determining a plurality of distance data from the plurality of satellites according to arrival times of, or times of acquiring the respective plurality of orbit data or some other data by above-mentioned acquiring, and pinpointing the current position of its own according to the plurality of orbit data or the plurality of distance data; monitoring an acquisition progress level until completely acquiring the plurality of orbit data sufficient for pinpointing the position and displaying a current data acquisition ratio relative to the plurality of orbit data sufficient for pinpointing the position in a display section by means of a level mark of a predetermined bar display; and counting the remaining effective time of the orbit data used for pinpointing the current geographical position and displaying the remaining effective time in the display section in a predetermined display format.

With this arrangement, the time that the user has to wait until accurately pinpointing the current position is roughly displayed by means of a level mark of a bar display showing the current acquiring ratio of data sufficient for pinpointing the position and subsequently the remaining effective service life of the orbit data used for pinpointing the current position is displayed so that the user can clearly and visually recognize the factors that make pinpointing the position impossible and the duration of time until the time when it is no longer possible to pinpoint the position.

Thus, the present invention can realize a navigation apparatus and a navigation-related information display method by means of which the time that the user has to wait until accurately pinpointing the current position is roughly displayed by means of a level mark of a bar display showing the current acquiring ratio of data sufficient for pinpointing the position and subsequently the remaining effective service life of the orbit data used for pinpointing the current position is displayed so that the user can clearly visually recognize the factors that make pinpointing the position impossible and the duration of time until the time when it is no longer possible to pinpoint the position. Thus, a navigation apparatus and a navigation-related information display method according to the present invention can recognize at a glance the progress of the operation of acquiring orbit data until it is no longer possible to pinpoint the current position.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, embodiments of the present invention will be described in greater detail by referring to the accompanying drawings.

(1) Overall Configuration of PND

Figure 1:
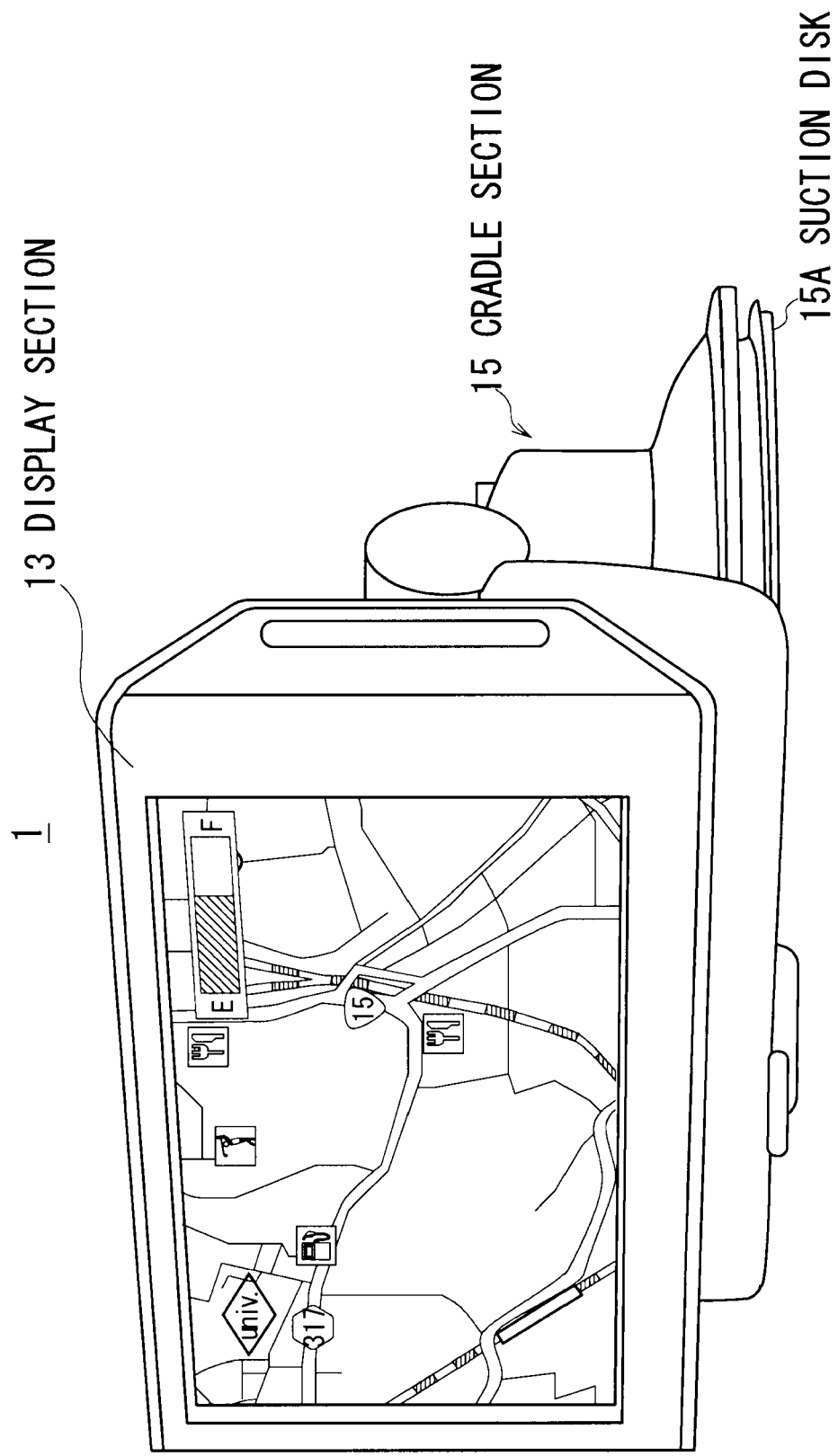
FIG. 1 is a schematic perspective view of a PND according to an embodiment of the present invention, showing the overall configuration thereof.

Referring to FIG. 1, reference numeral 1 generally denotes a portable navigation device (to be referred to as PND hereinafter) according to an embodiment of the present invention that has a display section 13 formed by mounting a 4.8-type liquid crystal display and a cradle section 15 arranged at the rear side of the display section 13. The PND can be mounted onto and removed from the dashboard of a vehicle by way of a suction disk 15A of the cradle section 15 with ease.

Generally, so-called full navigation systems are available. With the full navigation system, the running speed of the vehicle is computationally determined by the vehicle speed pulse taken in from the vehicle and the moving direction of the vehicle is determined according to the output from the gyro sensor of the system to reckon the current position of the vehicle not only by the current geographical position of a vehicle but also even when positions generally cannot be pinpointed by means of GPS satellites.

On the other hand, simple type navigation systems adapted to pinpoint the current geographical position of the vehicle only by means of GPS satellites without relying on a vehicle speed pulse and a gyro sensor are also available. Such a system can be removably mounted onto a vehicle very easily.

(2) Circuit Configuration of PND

Figure 2:
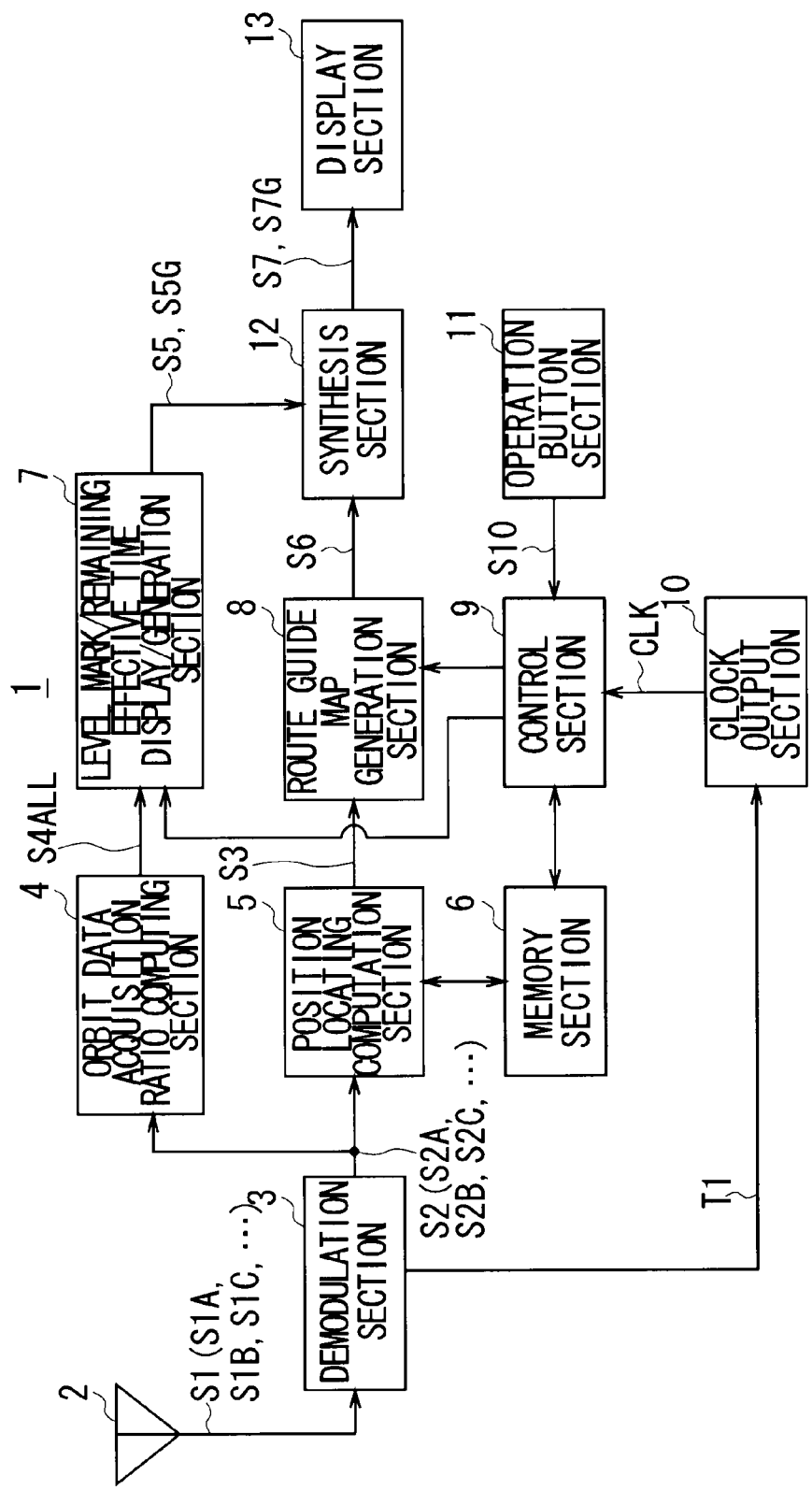
FIG. 2 is a schematic block diagram of a PND according to the embodiment of the present invention, showing the circuit configuration thereof.

Referring now to FIG. 2, the control section 9 of the PND 1, which is a microcomputer, generally controls the entire PND 1 according to a basic program and also executes various navigation processes according to various application programs stored in a memory section 6.

In actual operations, the PND 1 restores orbit data S2 (S2A, S2B, S2C, . . . ) by demodulating satellite signals S1 (S1A, S1B, S1C, . . . ) from a plurality of GPS satellites (satellite A, satellite B, satellite C, . . . ) that are received by a GPS antenna 2 by means of demodulation section 3 and sends out the restored orbit data to orbit data acquisition ratio computing section 4 and position locating computation section 5.

The orbit data S2 (S2A, S2B, S2C, . . . ) are detailed orbit information (parameters) indicating the orbits along which the GPS satellites are revolving. Orbit data needs to be acquired at least from three GPS satellites (satellite A, satellite B and satellite C) in order to accurately pinpoint the current geographical position of a vehicle. Orbit data are updated in every two hours and have an effective service life after the update.

The expression of "effective" as used herein refers to that the orbit data guarantee a predetermined level of accuracy when the current geographical position is pinpointed by means of the orbit data S2 (S2A, S2B, S2C, . . . ). In other words, a predetermined level of accuracy is not guaranteed when the current geographical position is pinpointed by means of the orbit data S2 (S2A, S2B, S2C, . . . ) after the elapse of four hours since the update.

Orbit data S2 (S2A, S2B, S2C, . . . ) are transmitted from GPS satellites at about 50 bps and it takes about 30 seconds for a PND 1 to receive the orbit data S2 (S2A, S2B, S2C, . . . ).

Therefore, if a PND 1 does not hold effective orbit data S2 (S2A, S2B, S2C, . . . ) and when its power source is turned on, it needs to acquire orbit data S2 (S2A, S2B and S2C) anew from at least three GPS satellites (satellite A, satellite B and satellite C).

In actuality, a PND 1 is designed to acquire orbit data S2 (S2A, S2B, S2C, . . . and S2H) not only from three GPS satellites (satellite A, satellite B and satellite C) but from about six to eight GPS satellites (satellite A, satellite B, satellite C, . . . and satellite H) from which it can receive signals and use arbitrarily selected three or more than three orbit data S2 (S2A, S2B, S2C, . . . ).

The demodulation section 3 extracts the clock time information T1 included in the orbit data S2 (S2A, S2B, S2C, . . . ) and supplies it to an clock output section 10. In response, the clock output section 10 accurately corrects the current clock time according to the clock time information T1 supplied from the demodulation section 3 and by turn supplies the corrected accurate clock time data CLK to the control section 9.

Figure 3:
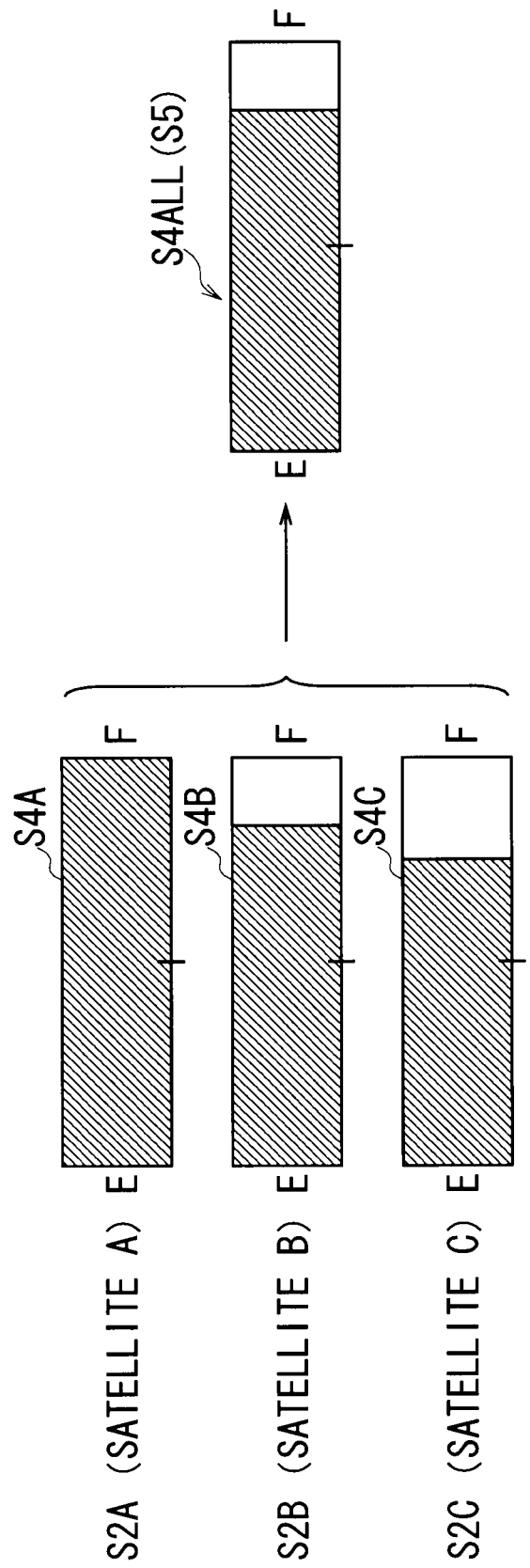
FIG. 3 is a schematic illustration of merging the acquiring ratios of orbit data.

The orbit data acquiring ratio computing section 4 monitors the individual acquisition progress levels S4 (S4A, S4B and S4C) of the orbit data S2 (S2A, S2B and S2C) transmitted from at least three GPS satellites (satellite A, satellite B and satellite C) necessary for pinpointing the current geographical position and computationally determines the current overall acquisition ratio S4ALL of all the individual acquiring progress level S4 (S4A, S4B and S4C) as shown in FIG. 3 and transmits it to a level mark/remaining effective time display/generation section 7.

The level mark/remaining effective time display/generation section 7 generates a bar display that represents the current overall acquisition ratio S4ALL of all the orbit data S2 (S2A, S2B and S2C) of the three GPS satellites (satellite A, satellite B and satellite C) supplied from the orbit data acquisition ratio computing section 4 as level mark (which will be described later) and transmits the generated level mark data S5 to synthesis section 11.

The position locating computation section 5 pinpoints the current geographical position of the vehicle according to the orbit data S2 (S2A, S2B and S2C) and the distance data on the distances from the three GPS satellites (satellite A, satellite B and satellite C) to the vehicle and transmits the current position data S3 to route guide map generation section 8 and also to memory section 6, which is a hard disk or a nonvolatile memory.

The memory section 6 sequentially stores and holds the current position data S3 transmitted from the position locating computation section 5 after each position pinpointing operation.

Thus, the position locating computation section 5 can execute computational operations for pinpointing the geographical position of the vehicle when all the orbit data S2 (S2A, S2B and S2C) from three GPS satellites (satellite A, satellite B and satellite C) are acquired and hence the acquisition ration S4ALL as computed by the orbit data acquisition ratio computing section 4 becomes equal to 100%.

The route guide map generation section 8 searches for the available best running route from the current position of the vehicle to the specified destination according to a route search command S10 supplied in response to a user operation of depressing a corresponding button in the operation button section 11 that includes various buttons arranged on the surface panel (not shown) of the PND 1 and generates a route guide map including the running routes. Then, the route guide map generation section 8 transmits the route guide map data S6 it generates to synthesis section 12.

Figure 4:
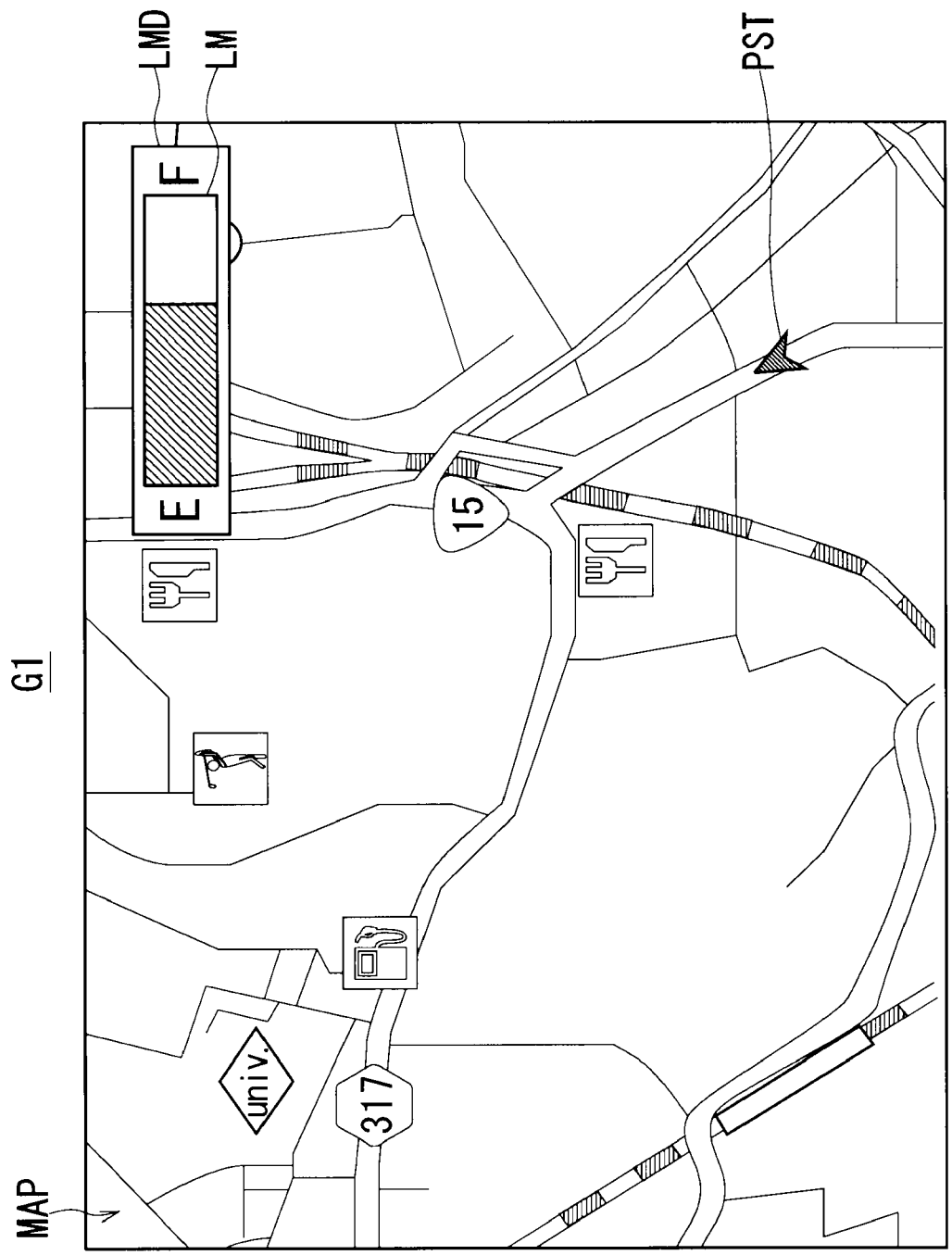
FIG. 4 is a schematic illustration of an image of a guide map where a level mark is displayed.

The synthesis section 12 synthetically superimposes a level mark image LMD, which includes a level mark LM that corresponds to the level mark data S5, at a predetermined position on the route guide map MAP generated according to the rouge guide map data S6 as shown in FIG. 4.

Thus, the synthesis section 12 generates a guide map image G1 where the level mark image LMD is superimposed on the route guide map MAP for guiding the user along the selected route from the current position icon PST indicating the current position of the vehicle to the destination (not shown) and outputs guide map image data S7 that correspond to the guide map image G1 to the display section 13.

As the display section 13 displays the guide map image G1 (FIG. 4) that corresponds to the guide map image data S7, the user can visually recognize the running route from the current position icon PST to the destination and also the level mark LM of the level mark image LMD.

Note that "E (empty) is displayed to the left of the level mark LM while "F (full)" is displayed to the right of the level mark LM in the level mark image LMD so as to indicate the current overall acquisition ratio S4ALL relative to the orbit data S2 (S2A, S2B and S2C) to be acquired.

The level mark/remaining effective time display/generation section 7 counts the remaining effective time of the orbit data S2 (S2A, S2B and S2C), or the elapsed time, from the time when the overall acquisition ratio S4ALL (FIG. 3) relative to the orbit data S2 (S2A, S2B and S2C) from the three GPS satellites (satellite A, satellite B and satellite C) as supplied from the orbit data acquisition ratio computing section 4 gets to 100%, or "F (full)".

The level mark/remaining effective time display/generation section 7 monitors the individual acquisition ratios of the orbit data S2 (S2A, S2B, S2C, . . . ) transmitted from all the GPS satellites (satellite A, satellite B, satellite C, . . . ) from which the PND 1 can receive signals. Thus, the level mark/remaining effective time display/generation section 7 counts the remaining effective time by referring to the orbit data having the third longest remaining effective time among the orbit data S2 (S2A, S2B, S2C, . . . ) acquired from all the GPS satellites (satellite A, satellite B, satellite C, . . . ) from which the PND 1 can receive signals.

Figure 5:
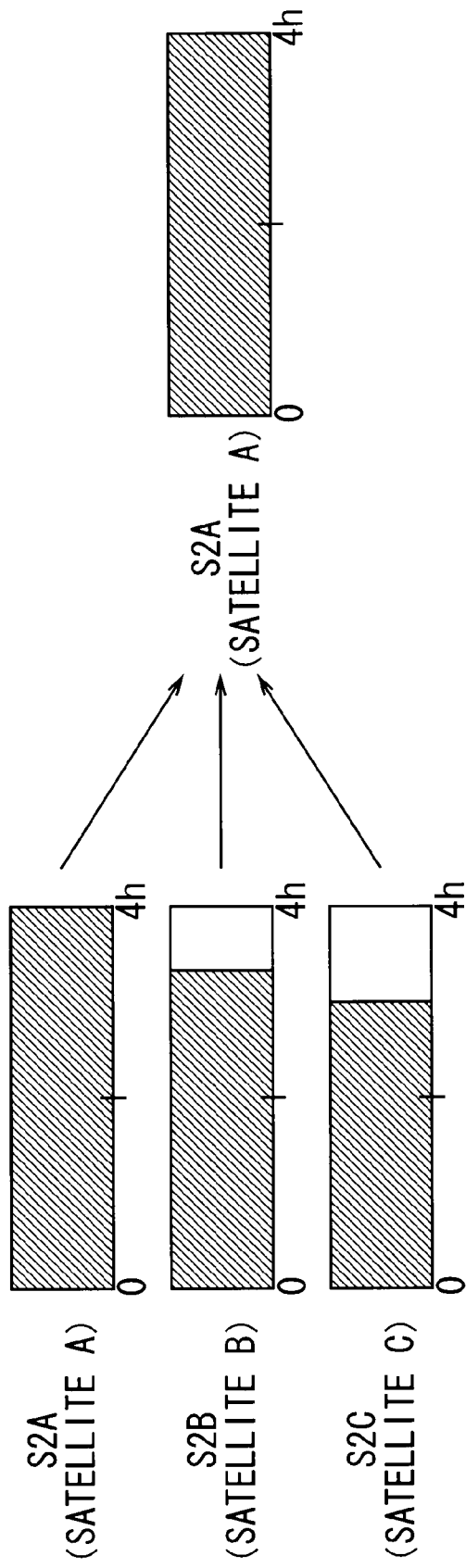
FIG. 5 is a schematic illustration of selection of a satellite as reference for counting down the remaining effective service life.

In actuality, the level mark/remaining effective time display/generation section 7 starts counting the remaining effective time from the time when it completely acquires the orbit data S2A of the satellite A that is the third satellite from the last in terms of completely acquiring orbit data out of all the GPS satellites (satellite A, satellite B, satellite C, . . . ) from which the PND 1 can receive signals and completely acquires all the orbit data thereof as shown in FIG. 5.

Thus, the level mark/remaining effective time display/generation section 7 starts counting down the four hours that is the longest remaining effective time. Then, for example, it provides the level mark with a gradation that falls, or a color that fades, every 10 minutes as shown in FIGS. 6A through 6F from the time when the remaining effective time gets short of an hour (60 minutes) and transmits level mark data S5GA through S5GF that correspond to the level marks LMA through LMF of different gradations to the synthesis section 12.

In response, the synthesis section 12 sequentially generates guide maps where level marks LMA through LMF of different gradations are respectively superimposed at a predetermined position on the route guide maps MAP, which respectively correspond to the route guide map data S6, such that the gradation falls with time according to the level mark data S5G (S5GA through S5GF), and outputs the guide map data S7G of the guide maps to the display section 13.

Figure 7:
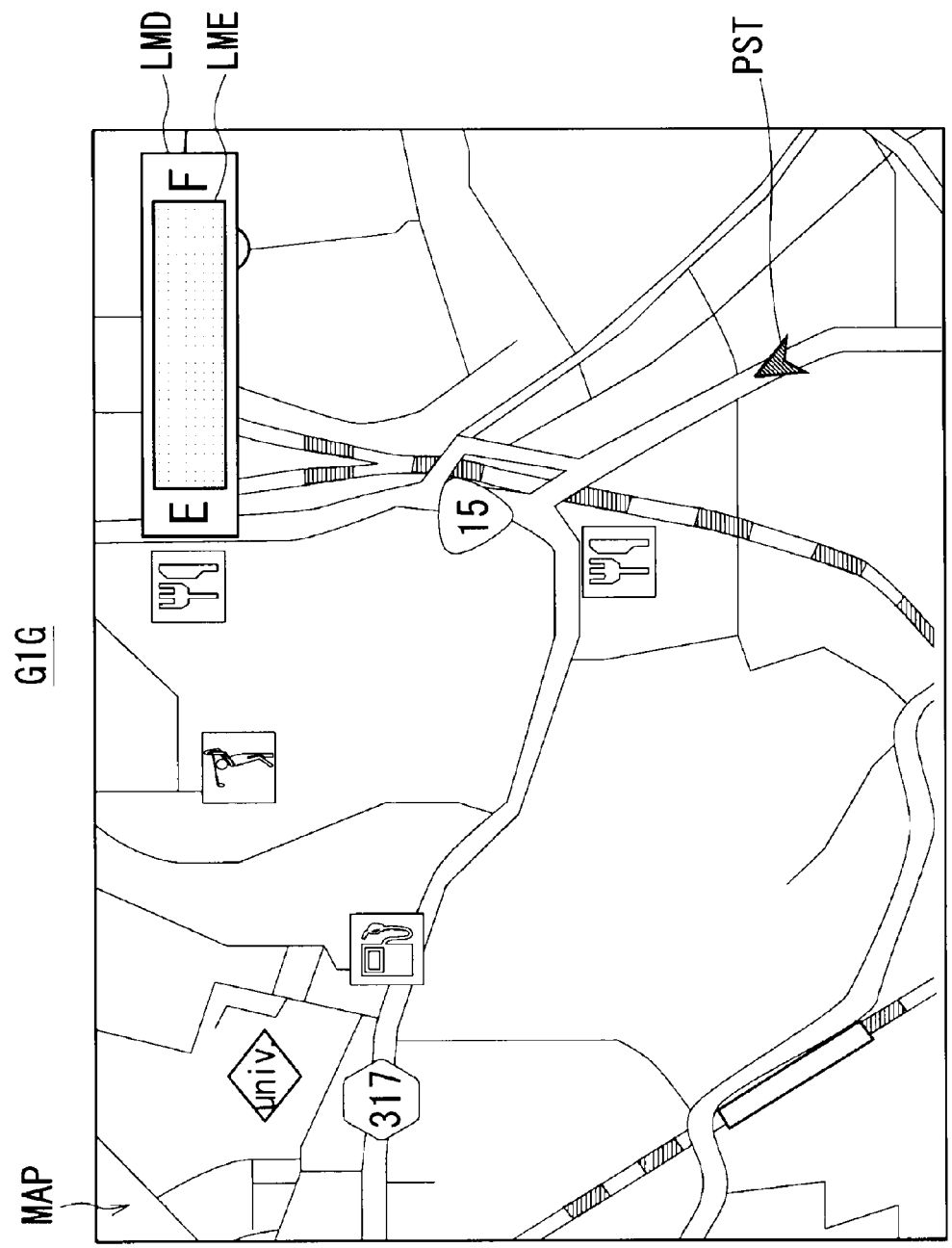
FIG. 7 is a schematic illustration of an image of a guide map where a level mark is displayed by means of a gradation display system.

The display section 13 displays a guide map image G1G according to the guide map data S7G as shown in FIG. 7 so that the user can visually recognize the running route from the current position to the destination and also the level mark image LMD that includes a level mark LME (S5GE) of a gradation selected from the different gradations. Thus, the user can recognize that the remaining effective time of the orbit data S2 that can be used for pinpointing the current geographical position of the vehicle is running out easily intuitively.

Now, the navigation-related information display process sequence for making the user recognize the navigation-related information such as the level mark LM relating to the orbit data S2 (S2A, S2B and S2C) on the PND 1 easily and intuitively will be described in detail by referring to the flowchart of FIG. 8.

(3) Navigation-Related Information Display Process Sequence

Figure 8:
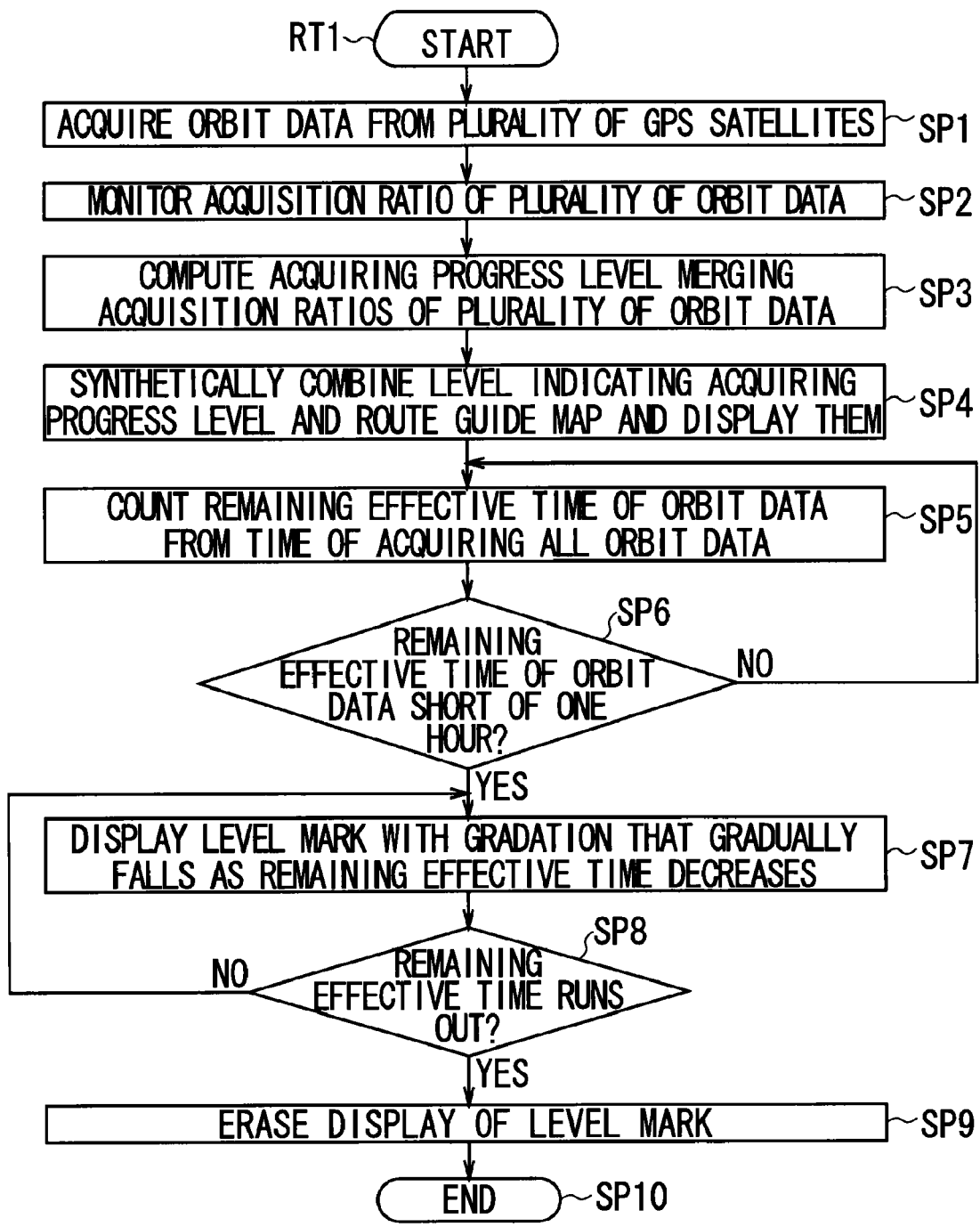
FIG. 8 is a flowchart of the navigation-related information display process sequence according to the embodiment of the present invention.

Referring to FIG. 8, the control section 9 of the PND 1 starts routine RT1 according to the navigation-related information display program that is an application program started from the memory section 6 and moves to Step SP1, where it acquires orbit data S2 (S2A, S2B, S2C, ...) respectively from a plurality of GPS satellites (satellite A, satellite B, satellite C, ...), and then moves to the next step, or Step SP2.

In Step SP2, the control section 9 monitors the overall acquisition ratio of the orbit data S2 (S2A, S2B and S2C) obtained by merging the acquisition progress levels S4 (S4A, S4B and S4C) of the three orbit data S2 (S2A, S2B and S2C) that are being acquired from the three GPS satellites (satellite A, satellite B and satellite C) out of the plurality of GPS satellites (satellite A, satellite B, satellite C, ...) and then moves to the next step of Step SP3.

In Step SP3, the control section 9 computationally determines the overall acquisition ratio S4ALL of the orbit data S2 (S2A, S2B and S2C) by merging the acquisition progress levels S4 (S4A, S4B and S4C) of the three orbit data S2 (S2A, S2B and S2C) being acquired from the three GPS satellites (satellite A, satellite B and satellite C) as shown in FIG. 3 and then moves to the next step, or Step SP4.

In Step SP4, the control section 9 generates a level mark LM indicating the overall acquisition ratio S4ALL of the orbit data S2 (S2A, S2B and S2C) computationally determined in Step SP3. Then, it generates guide map data S7 by synthetically combining the level mark data S5 that corresponds to the level mark LM and the route guide map data S6 and subsequently displays the guide map image G1 (FIG. 4) that corresponds to the guide map data S7 before it moves to the next step, or Step SP5.

More specifically, the control section 9 superimposes the level mark image LMD that includes the level mark LM, which is a bar display, corresponding to the overall acquisition ratio S4ALL of the orbit data S2 (S2A, S2B and S2C) on the guide map image G1 at a predetermined upper right position so that the user can recognize the overall acquisition ratio S4ALL of the three orbit data S2 (S2A, S2B and S2C) necessary for pinpointing the current geographical position of the vehicle easily and intuitively.

While the control section 9 displays the bar display of the level mark LM, expanding it according to the overall acquisition ratio S4ALL, it may also emits a predetermined sound, raising the level of the sound as a function of the expansion of the bar display, or changing the predetermined sound so that the user may both visually and aurally recognize the increase of the overall acquisition ratio S4ALL of the orbit data S2 (S2A, S2B and S2C).

In Step SP5, when the bar display of the level mark LM gets to the "F" position and hence all the three orbit data S2 (S2A, S2B and S2C) are acquired, the control section 9 starts counting the time elapsed since the time of completion of acquisition of the orbit data S2A of the satellite that is the third satellite from the last in terms of completely acquiring orbit data (or having the remaining effective time of the orbit data S2A) and then moves to the next step, or Step SP6.

While the control section 9 may start counting the remaining effective time from the time when all the three orbit data S2 (S2A, S2B and S2C) are acquired and at hand. However, the remaining effective time of the orbit data S2A acquired from the GPS satellite A expires first and then it is no longer possible to pinpoint the current geographical position of the vehicle. Therefore, the control section 9 starts counting the remaining effective time from the time of completion of acquisition of the orbit data S2A of the GPS satellite A.

In Step SP6, the control section 9 determines if the remaining effective time of the orbit data S2A gets short of an hour or not. It returns to Step SP5 and repeats the above step when the answer to this question is negative, whereas it proceeds to the next step, or Step SP7 when the answer to this question is positive.

In Step SP7, the control section 9 displays the level marks LMA through LMF with a gradation that falls every 10 minutes, or as the remaining effective time falls to be 60 minutes, 50 minutes, 40 minutes, 30 minutes, 20 minutes and 10 minutes as shown in FIGS. 6A through 6F from the time when the remaining effective time gets short of an hour (60 minutes) (FIG. 7) and then moves to the next step, or Step SP8.

In Step SP8, the control section 9 determines if the remaining effective time of the orbit data S2A acquired from the GPS satellite A gets to 0 minutes or not. If the answer to the question is negative, it means that there are still several minutes left as remaining effective time. Then, it returns to Step SP7 and continues displaying the level mark with the corresponding gradation.

If, on the other hand, the answer to the question is positive, it means that the remaining effective time of the orbit data S2A acquired from the GPS satellite A is gone, or 0 minutes, and it is no longer possible to pinpoint the current geographical position of the vehicle according to the three orbit data S2 (S2A, S2B and S2C). Then, the control section 9 moves to the next step, or Step SP9.

Figure 6:
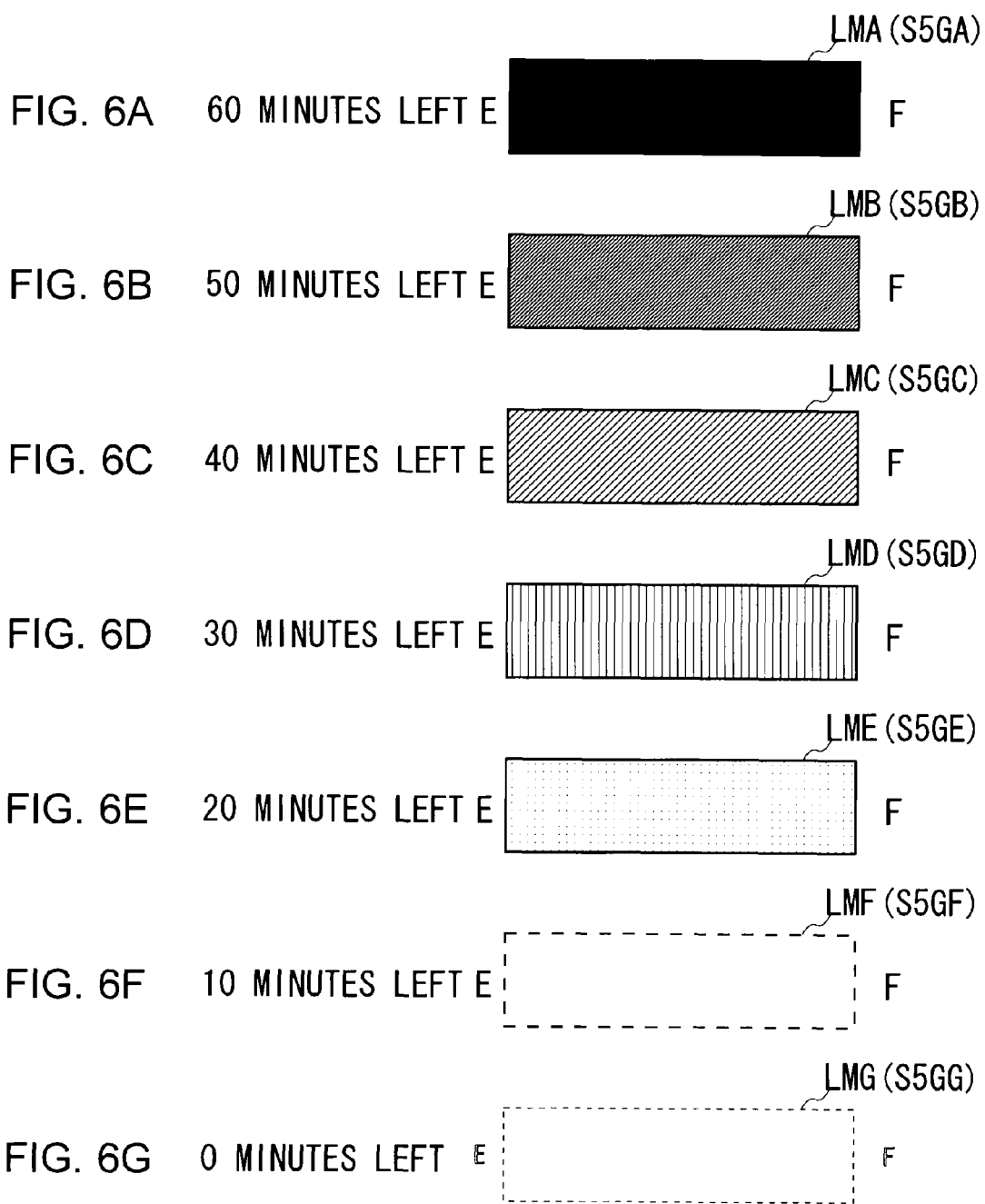
FIGS. 6A to 6G are schematic illustrations of an exemplar gradation display system.

In Step SP9, the control section 9 erases the level mark LM from the guide map image G1G as shown in FIG. 6G because the remaining effective time is 0 minutes. Thus, the user can recognize that the current geographical position of the vehicle cannot be pinpointed easily and intuitively. Then, the control section 9 moves to the next step, or Step SP10, to end the process.

(4) Operation and Advantages

With the above-described arrangement, the PND 1 acquires orbit data S2 (S2A, S2B, S2C, ...) from the plurality of GPS satellites (satellite A, satellite B, satellite C, ...) from which it can receive signals and determines the overall acquisition progress level S4ALL of the orbit data S2 (S2A, S2B and S2C) of at least three GPS satellites (satellite A, satellite B and satellite C) out of those plurality of GPS satellites by merging the individual acquisition progress levels S4 (S4A, S4B and S4C) of the orbit data S2 (S2A, S2B and S2C). Then, the PND 1 generates a guide map image G1 where the level mark LM, which is a bar display showing the overall acquisition progress level, is superimposed on a corresponding route guide map MAP at a predetermined position and displays the guide map image G1.

As a result, the PND 1 can make the user visually recognize the extent to which the bar display of the level mark LM is expanded so that the user can roughly realize the time for which he or she has to wait until the current geographical position of the vehicle is pinpointed.

Additionally, since the PND 1 can show the user the extent to which the bar display of the level mark LM is expanded, the user may be guided to a position in the user's house, for example, where the PND 1 can easily acquire the orbit data S2 (S2A, S2B and S2C) of at least three GPS satellites (satellite A, satellite B and satellite C) by referring to the level mark LM once the power source of the PND 1 is turned on so that the PND 1 can acquire all the orbit data S2 (S2A, S2B and S2C) before the user mount the PND 1 on his or her vehicle.

Thereafter, as the PND 1 acquires all the orbit data S2 (S2A, S2B and S2C), the bar display of the level mark LM gets to "F (full)", or 100%. Thereafter, the PND 1 counts the elapsed time (remaining effective time) from the time when the orbit data S2A of the third satellite A that is the third satellite from the last in terms of completely acquiring orbit data.

Then, the PND 1 shows the remaining effective time by providing the bar display of the level LM with a gradation that falls gradually from the time when the remaining effective time of the orbit data S2A gets short of an hour in order to make the user realize that the remaining effective time of the orbit data S2 (S2A, S2B and S2C), in which the current geographical position of the vehicle can be pinpointed with a predetermined level of accuracy, is running out easily and intuitively by way of the gradually falling gradation.

In this way, while the PND 1 displays the increasing overall acquisition ratio S4ALL of the orbit data S2 (S2A, S2B and S2C), raising the color density of the bar display of the level mark LM, it provides the bar display of the level mark LM with a gradation that falls to show the remaining effective time of the orbit data S2 (S2A, S2B and S2C), holding the bar display of the level mark LM to a fixed level.

With this arrangement, the PND 1 can make the user accurately and reliably recognize both the increasing overall acquisition ratio S4ALL of the orbit data S2 (S2A, S2B and S2C) for pinpointing the current geographical position of the vehicle and the remaining effective time in which the current geographical position can be pinpointed without confusion.

Additionally, when the PND 1 succeeds in acquiring the orbit data S2 (S2A, S2B, S2C, . . . ) of three or more than three GPS satellites (satellite A, satellite B, satellite C, . . . ) and the shortest remaining effective time of the orbit data S2A runs out, it can switch from the orbit data S2A to the orbit data S2D of the satellite D if the effective time of the orbit data S2D still remains.

Thus, in such a case, the PND 1 can display the bar display of the level mark LM with a gradation that changes according to the remaining effective time of the orbit data S2B, which the PND 1 can acquire earliest in the orbit data S2 (S2B, S2C and S2D).

With the above-described arrangement of the present invention, the PND 1 can make the user recognize the increasing overall acquisition ratio S4ALL of the orbit data S2 (S2A, S2B and S2C) by means of the bar display of the level mark LM and also the remaining effective time of the orbit data S2 (S2A, S2B and S2C) by providing the color bar display of the level mark LM with a gradation that falls with time so that the PND 1 can show the user the extent to which the orbit data S2 (S2A, S2B and S2C) are acquired until the current geographical position of the vehicle can be or can no longer be pinpointed.

(5) Other Embodiments

While the level mark LM is provided with a gradation when the remaining effective time gets short of an hour in the above-described embodiment, the present invention is by no means limited thereto and the level mark LM may alternatively be provided with a gradation when the remaining effective time gets short of an arbitrarily selected number of hours such as maximally four hours, two hours or a half hour.

While the level mark LM is completely erased from the guide map image G1G as shown in FIG. 6G in the above-described embodiment, the present invention is by no means limited thereto and alternatively a trace of the level mark LM may be left on the guide map image G1G so that the user may recognize that level mark LM was there once.

Figure 9:
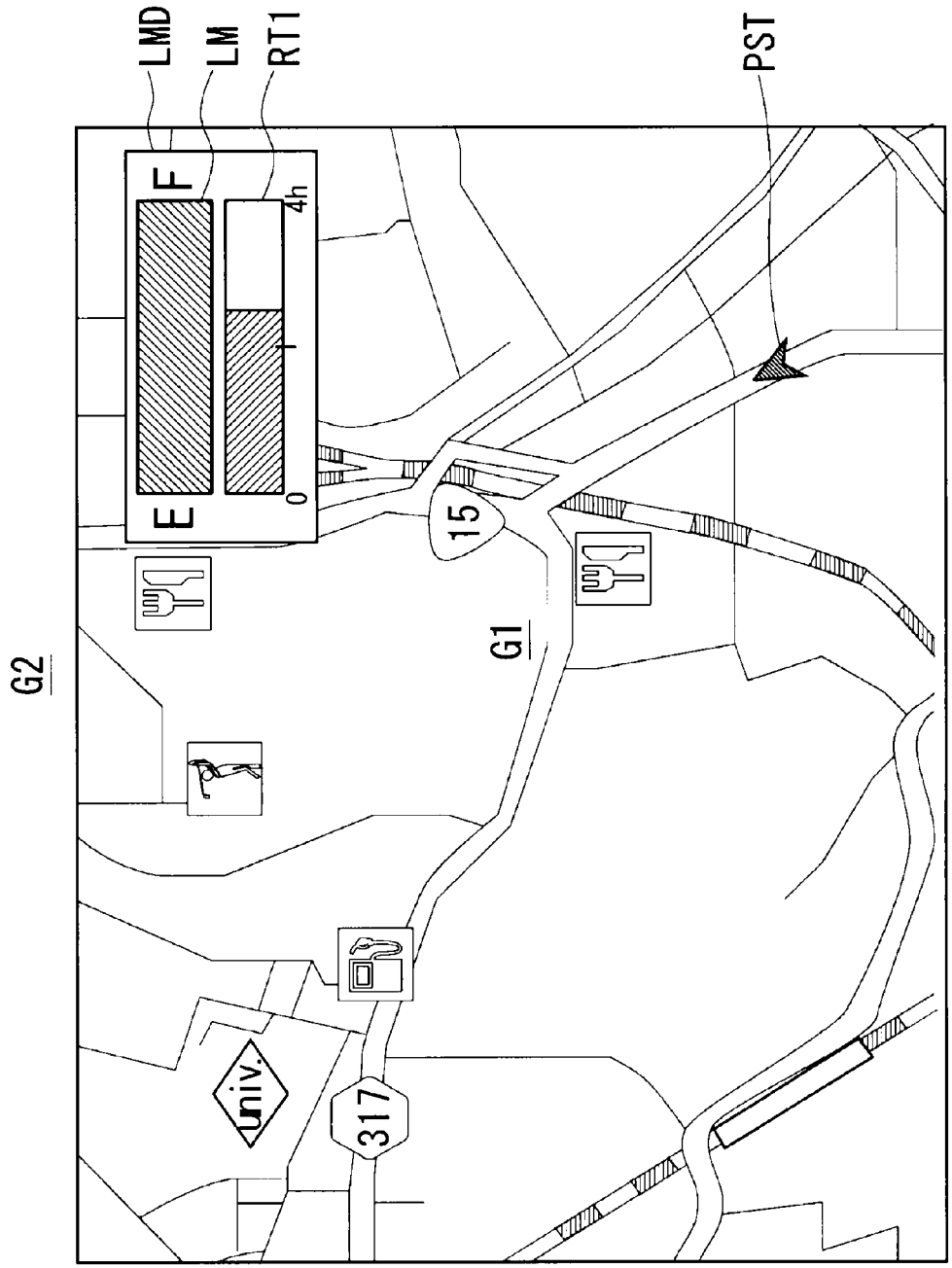
FIG. 9 is a schematic illustration of an image of a guide map where a level mark is displayed shown as a display example (1) of navigation-related information display method according to another embodiment of the present invention.

While the gradation of the bar display, or the level mark LM is provided with a gradation that changes as a function of the remaining effective time in the above-described embodiment, the present invention is by no means limited thereto and alternatively a remaining effective time display section RT1 may be displayed in the guide map image G2 as another bar display as shown in FIG. 9.

With such an arrangement, the user can recognize the remaining effective time of the orbit data S2 (S2A, S2B and S2C) easily and intuitively by seeing the bar display of the remaining effective time display section RT1.

Figure 10:
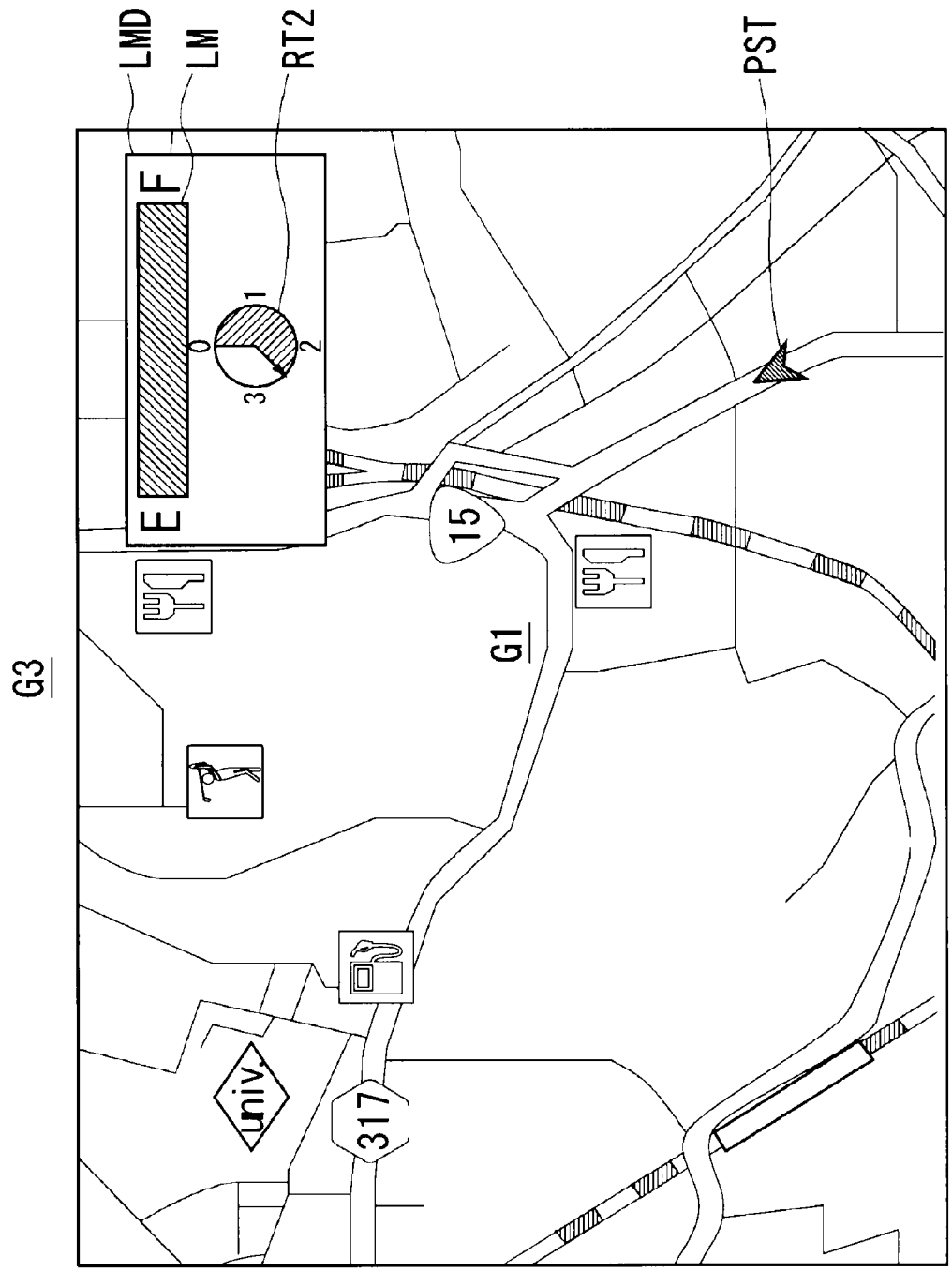
FIG. 10 is a schematic illustration of an image of a guide map where a level mark is displayed shown as a display example (2) of navigation-related information display method according to still another embodiment of the present invention.

While the bar display of the level mark LM is provided with a gradation that changes as a function of the remaining effective time in the above-described embodiment, the present invention is by no means limited thereto and a remaining effective time display section RT2 that resembles an analog clock may be displayed in the guide map image G3 as shown in FIG. 10.

With such an arrangement, the user can recognize the remaining effective time of the orbit data S2 (S2A, S2B and S2C) easily and intuitively by seeing the display that resembles an analog lock of the remaining effective time display section RT2.

Figure 11:
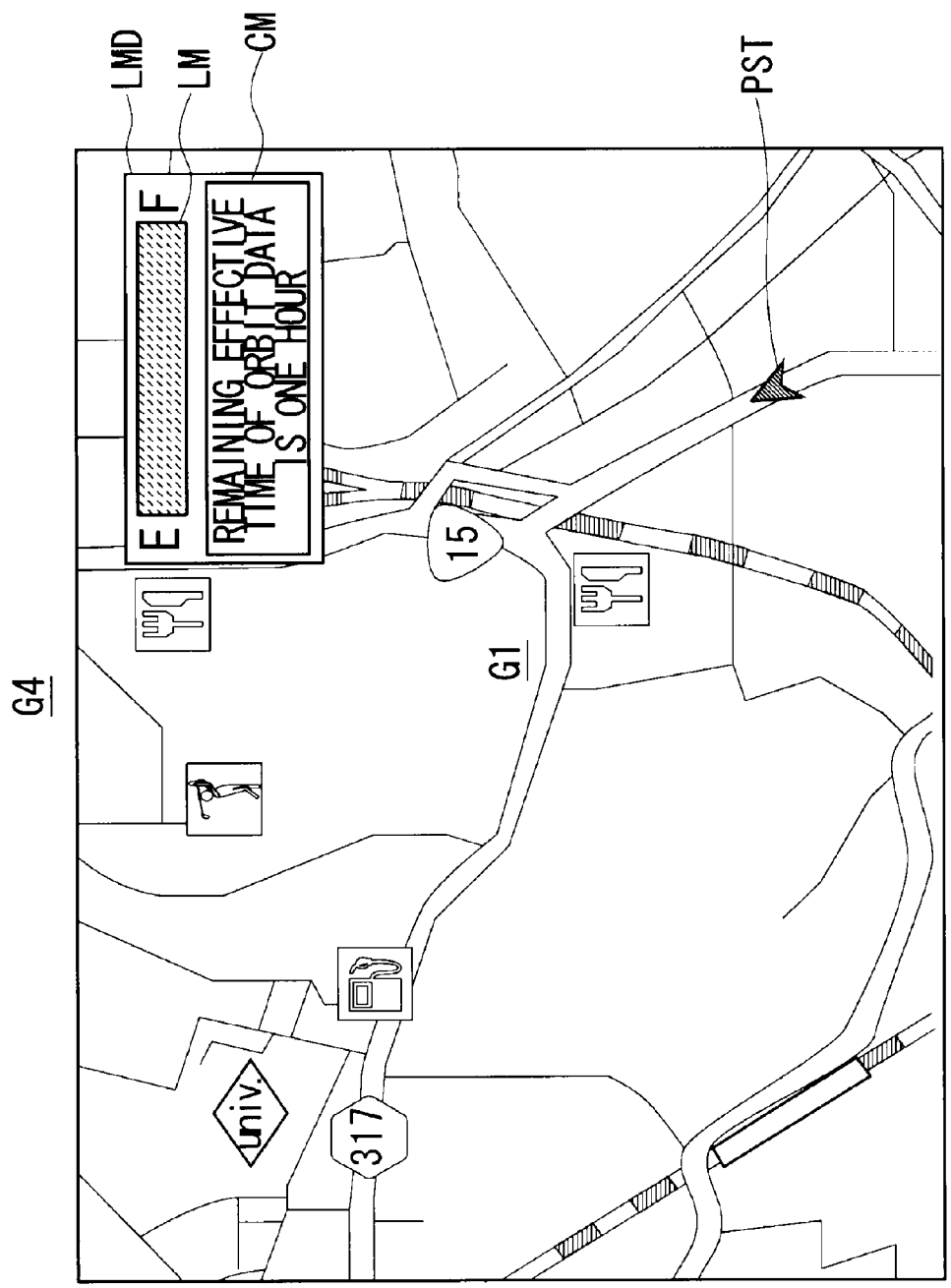
FIG. 11 is a schematic illustration of an image of a guide map where a level mark is displayed shown as a display example (3) of navigation-related information display method according to still another embodiment of the present invention.

While the bar display of the level mark LM is provided with a gradation that changes as a function of the remaining effective time in the above-described embodiment, the present invention is by no means limited thereto and alternatively a message CM "The remaining effective time of the orbit data is an hour." telling that the remaining effective time of the orbit data S2 (S2A, S2B and S2C) is an hour may be displayed in addition to the level mark LM in the level mark image LMD of the guide map image G4 as shown in FIG. 11.

With such an arrangement, the PND 1 can make the user recognize the remaining effective time by means of a text. Still alternatively, the PND 1 may also provide the level mark LM with a gradation in addition to the message CM that is displayed in parallel with the level mark LM.

While the elapsed time is counted from the time when the orbit data S2A of the satellite that is the third satellite from the last in terms of completely acquiring orbit data (or having the remaining effective time of the orbit data S2A) is completely acquired in the above-described embodiment, the present invention is by no means limited thereto and alternatively the elapsed time, or the remaining effective time, may be counted from the average time of the times when the orbit data S2 (S2A, S2B and S2C) are completely acquired.

While the navigation-related information display process sequence of the routine RT1 is executed according to the navigation-related information display program that the control section 9 of the PND 1 starts from the memory section 9 in the above-described embodiment, the present invention is by no means limited thereto and alternatively, the navigation-related information display process sequence may be executed according to the navigation-related information display program stored in a recording medium such as a compact disk (CD) or a semiconductor memory, downloaded from Internet or otherwise installed.

While the navigation apparatus of the above-described embodiment is formed by a demodulation section 3 that operates as an acquisition unit, a position locating computation section 5 that operates as a pinpointing unit the current geographical position, an orbit data acquisition ratio computing section 4 that operates as an acquisition progress level display unit, a level mark/remaining effective time display/generation section 7 and control section 9 as a remaining effective time display unit, the present invention is by no means limited thereto and alternatively a navigation apparatus according to the embodiment of the present invention may be formed by a reception unit, a current position pinpointing unit, an acquisition progress level display unit and a remaining effective time display unit respectively having various circuit configurations.

A navigation apparatus and a navigation-related information display method according to the embodiment of the present invention can find applications in various electronic appliances including notebook type personal computers, personal digital assistant (PDA), portable telephone sets and portable game machines having a position locating unit that relies solely on a GPS.

It should be understood by those skilled in the art that various modifications, combinations sub-combinations and alterations may occur depending on design requirements and other factors insofar as they are within the scope of the appended claims or the equivalents thereof.

What is claimed is:

1. A navigation apparatus, comprising:
an acquisition unit that acquires a plurality of orbit data by demodulating each of the orbit data of a plurality of satellites received from the satellites;
a current position locating unit that computationally determines a plurality of distance data from the plurality of satellites according to arrival times of, or times of acquiring the respective plurality of orbit data or some other data by the acquisition unit, and pinpoints the current position of its own according to the plurality of orbit data or the plurality of distance data;
an acquisition progress level display unit that monitors an acquisition progress level until completely acquiring the plurality of orbit data sufficient for pinpointing the position and displays a current data acquisition ratio relative to the plurality of orbit data sufficient for pinpointing the position in a display section using a level mark of a predetermined bar display; and
a remaining effective time display unit that counts the remaining effective time of the orbit data used for pinpointing the current geographical position and displays the remaining effective time in the display section in a predetermined display format, wherein
the remaining effective time display unit displays the bar display of the level mark, providing it with a gradation of a color that fades as a function of the decrease of the remaining effective time.

2. The apparatus according to claim 1, wherein
the remaining effective time display unit starts providing the bar display of the level mark with a gradation when the remaining effective time falls below a predetermined time.

3. The apparatus according to claim 1, wherein
the remaining effective time display unit displays the remaining effective time, providing it with a gradation, and at the same time displays a text telling the remaining effective time.

4. A navigation apparatus, comprising:
an acquisition unit that acquires a plurality of orbit data by demodulating each of the orbit data of a plurality of satellites received from the satellites;
a current position locating unit that computationally determines a plurality of distance data from the plurality of satellites according to arrival times of, or times of acquiring the respective plurality of orbit data or some other data by the acquisition unit, and pinpoints the current position of its own according to the plurality of orbit data or the plurality of distance data;
an acquisition progress level display unit that monitors an acquisition progress level until completely acquiring the plurality of orbit data sufficient for pinpointing the position and displays a current data acquisition ratio relative to the plurality of orbit data sufficient for pinpointing the position in a display section using a level mark of a predetermined bar display; and
a remaining effective time display unit that counts the remaining effective time of the orbit data used for pinpointing the current geographical position and displays the remaining effective time in the display section in a predetermined display format, wherein
the remaining effective time display unit displays a predetermined bar display showing the extent by which the remaining effective time is decreased apart from the level mark.

5. A navigation apparatus, comprising:
an acquisition unit that acquires a plurality of orbit data by demodulating each of the orbit data of a plurality of satellites received from the satellites;
a current position locating unit that computationally determines a plurality of distance data from the plurality of satellites according to arrival times of, or times of acquiring the respective plurality of orbit data or some other data by the acquisition unit, and pinpoints the current position of its own according to the plurality of orbit data or the plurality of distance data;
an acquisition progress level display unit that monitors an acquisition progress level until completely acquiring the plurality of orbit data sufficient for pinpointing the position and displays a current data acquisition ratio relative to the plurality of orbit data sufficient for pinpointing the position in a display section using a level mark of a predetermined bar display; and
a remaining effective time display unit that counts the remaining effective time of the orbit data used for pinpointing the current geographical position and displays the remaining effective time in the display section in a predetermined display format, wherein
the remaining effective time display unit displays a predetermined circle graph showing the extent by which the remaining effective time is decreased apart from the level mark.

6. A navigation-related information display method comprising:
- an orbit data acquisition step of acquiring a plurality of orbit data by demodulating each of the orbit data of a plurality of satellites received from the satellites;
- a current position locating step of computationally determining a plurality of distance data from the plurality of satellites according to arrival times of, or times of acquiring the respective plurality of orbit data or some other data by the orbit data acquisition step, and pinpointing the current position of its own according to the plurality of orbit data or the plurality of distance data;
- an acquisition progress level display step of monitoring an acquisition progress level until completely acquiring the plurality of orbit data sufficient for pinpointing the position and displaying a current data acquisition ratio relative to the plurality of orbit data sufficient for pinpointing the position in a display section by means of a level mark of a predetermined bar display; and
- a remaining effective time display step of counting the remaining effective time of the orbit data used for pinpointing the current geographical position and displaying the remaining effective time in the display section in a predetermined display format, wherein
- the remaining effective time display step displays the bar display of the level mark, providing it with a gradation of a color that fades as a function of the decrease of the remaining effective time.

7. The method according to claim 6, wherein
the remaining effective time display step starts providing the bar display of the level mark with a gradation when the remaining effective time falls below a predetermined time.

8. The method according to claim 6, wherein
the remaining effective time display step displays the remaining effective time, providing it with a gradation, and at the same time displays a text telling the remaining effective time.

9. A navigation-related information display method comprising:
- an orbit data acquisition step of acquiring a plurality of orbit data by demodulating each of the orbit data of a plurality of satellites received from the satellites;
- a current position locating step of computationally determining a plurality of distance data from the plurality of satellites according to arrival times of, or times of acquiring the respective plurality of orbit data or some other data by the orbit data acquisition step, and pinpointing the current position of its own according to the plurality of orbit data or the plurality of distance data;
- an acquisition progress level display step of monitoring an acquisition progress level until completely acquiring the plurality of orbit data sufficient for pinpointing the position and displaying a current data acquisition ratio relative to the plurality of orbit data sufficient for pinpointing the position in a display section by means of a level mark of a predetermined bar display; and
- a remaining effective time display step of counting the remaining effective time of the orbit data used for pinpointing the current geographical position and displaying the remaining effective time in the display section in a predetermined display format, wherein
- the remaining effective time display step displays a predetermined bar display showing the extent by which the remaining effective time is decreased apart from the level mark.

10. A navigation-related information display method comprising:
- an orbit data acquisition step of acquiring a plurality of orbit data by demodulating each of the orbit data of a plurality of satellites received from the satellites;
- a current position locating step of computationally determining a plurality of distance data from the plurality of satellites according to arrival times of, or times of acquiring the respective plurality of orbit data or some other data by the orbit data acquisition step, and pinpointing the current position of its own according to the plurality of orbit data or the plurality of distance data;
- an acquisition progress level display step of monitoring an acquisition progress level until completely acquiring the plurality of orbit data sufficient for pinpointing the position and displaying a current data acquisition ratio relative to the plurality of orbit data sufficient for pinpointing the position in a display section by means of a level mark of a predetermined bar display; and
- a remaining effective time display step of counting the remaining effective time of the orbit data used for pinpointing the current geographical position and displaying the remaining effective time in the display section in a predetermined display format, wherein
- the remaining effective time display step displays a predetermined circle graph showing the extent by which the remaining effective time is decreased apart from the level mark.

* * * * *